(12) United States Patent
Ginzboorg et al.

(10) Patent No.: US 9,313,655 B2
(45) Date of Patent: Apr. 12, 2016

(54) LOCATION PRIVACY IN COMMUNICATION NETWORKS

(75) Inventors: Philip Ginzboorg, Espoo (FI); Lars Eggert, Helsinki (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 17 days.

(21) Appl. No.: 14/354,829

(22) PCT Filed: Oct. 31, 2011

(86) PCT No.: PCT/FI2011/050951
§ 371 (c)(1),
(2), (4) Date: Jul. 26, 2014

(87) PCT Pub. No.: WO2013/064715
PCT Pub. Date: May 10, 2013

(65) Prior Publication Data
US 2015/0163667 A1    Jun. 11, 2015

(51) Int. Cl.
H04L 29/06    (2006.01)
H04W 12/02   (2009.01)
H04W 8/16    (2009.01)
G06F 21/62   (2013.01)

(52) U.S. Cl.
CPC ........... H04W 12/02 (2013.01); G06F 21/6218 (2013.01); H04L 63/04 (2013.01); H04W 8/16 (2013.01)

(58) Field of Classification Search
CPC ........ H04W 12/02; H04W 8/16; H04L 63/04; G06F 21/6218
See application file for complete search history.

(56) References Cited

U.S. PATENT DOCUMENTS

| | | | |
|---|---|---|---|
| 6,798,785 B1* | 9/2004 | Sasson et al. | 370/466 |
| 7,389,353 B2* | 6/2008 | Latvala | 709/228 |
| 2003/0018804 A1 | 1/2003 | Laxman et al. | |
| 2005/0050352 A1 | 3/2005 | Narayanaswami et al. | |
| 2007/0133542 A1 | 6/2007 | Kangude et al. | |
| 2008/0112331 A1* | 5/2008 | Long et al. | 370/245 |
| 2008/0291885 A1 | 11/2008 | Miao et al. | |
| 2009/0074187 A1* | 3/2009 | Inoue et al. | 380/270 |
| 2009/0138971 A1* | 5/2009 | Butti | 726/23 |
| 2009/0161569 A1* | 6/2009 | Corlett | 370/252 |
| 2011/0153905 A1* | 6/2011 | Otani et al. | 710/316 |
| 2012/0257753 A1 | 10/2012 | Ochikubo et al. | |

FOREIGN PATENT DOCUMENTS

EP    1337089    8/2003

OTHER PUBLICATIONS

Guo et al., "Sequence Number-Based MAC Address Spoof Detection", Proceedings of the 8th international conference on Recent Advances in Intrusion Detection, Sep. 7-9, 2005, 20 Pages.
Felts et al., "Measurement-Based Wireless LAN Troubleshooting", Proceedings of the 1st Workshop on Wireless Network Measurements, Apr. 2005, 6 Pages.
(Continued)

*Primary Examiner* — Mohammad A Siddiqi
(74) *Attorney, Agent, or Firm* — Harrington & Smith

(57) ABSTRACT

A method including changing an access address of a network interface of a wireless network node, changing a frame sequence number of a network interface of the wireless network node in an unpredictable manner, and performing the changing of the access address and changing of the frame sequence number in a coordinated manner.

15 Claims, 2 Drawing Sheets

(56) References Cited

OTHER PUBLICATIONS

Huang et al., "Enhancing Wireless Location Privacy Using Silent Period", IEEE Wireless Communications and Networking Conference, vol. 2, Mar. 13-17, 2005, 6 Pages.

Thomson et al., "IPv6 Stateless Address Autoconfiguration", Network Working Group, RFC 4862, Sep. 2007, pp. 1-30.

Gruteser et al., "Enhancing Location Privacy in Wireless LAN Through Disposable Interface Identifiers: A Quantitative Analysis", Mobile Networks and Applications, vol. 10, Issue 3, Jun. 2005, pp. 315-325.

International Search Report and Written Opinion received for corresponding Patent Cooperation Treaty Application No. PCT/FI2011/050951, dated Jul. 19, 2012, 11 pages.

Zhang et al. Client-based intrusion prevention system for 802.11 wireless LANs, IEEE Wireless and Mobile Computing, Networking and Communications (WiMob), 6th International Conference, Pscataway, NJ, USA, Nov. 10, 2010, p. 100-107.

Defrawy et al. "PEUC_WIN: Privacy Enhancement by User Cooperation in Wireless Networks" In: IEEE Secure Network Protocols, 2nd IEEE Workshop, Piscataway, NJ, USA, Jan. 11, 2006, p. 38-43.

Aura et al. Securing network location awareness with authenticated DHCP, In: IEEE Security and Privacy in Communications Networks and the Workshops. Piscataway, NJ, USA, Sep. 17, 2007, p. 391-402.

Kong et al. "Protection Against Mobile Tracing Through Motion-MIX for Mobile Wireless Nodes". In: IEEE Transactions on Vehicular Technology, Piscataway, NJ, USA, Jan. 6, 2009, p. 2406-2416.

Extended European Search Report received for corresponding European Patent Application No. 11874957.1, dated Jun. 22, 2015, 9 pages.

"Corrections to IE Definitions for E-DCH Data Frame and Common MAC Flow", 3GPP TSG-RAN WG3 Meeting #62, R3-083341, Ericsson, Nov. 10-14, 2008, pp. 1-2.

\* cited by examiner

LOCATION PRIVACY IN COMMUNICATION NETWORKS

RELATED APPLICATUION

This application was originally filed as PCT Application No. PCT/FI2011/050951 filed Oct. 31, 2011.

TECHNICAL FIELD

The present invention generally relates to location privacy in communication networks. The invention relates particularly, though not exclusively, to location privacy in wireless communication networks and mechanisms for avoiding undesired identification of a wireless network node.

BACKGROUND ART

It is often desirable that the location of a wireless network node communicating via a wireless communication network is maintained private. That is, it is desirable that a wireless network node cannot be identified by third parties on the basis of data packets sent/received by the wireless network node.

SUMMARY

According to a first example aspect of the invention there is provided a method comprising:
changing an access address of a network interface of a wireless network node,
changing a frame sequence number used by the network interface of a wireless network node in an unpredictable manner, and
performing said changing of the access address and changing of the frame sequence number in a coordinated manner.
According to a second example aspect of the invention there is provided an apparatus comprising:
at least one processor; and
at least one memory including computer program code, the at least one memory and the computer program code being configured to, with the at least one processor, cause the apparatus at least to perform:
changing an access address of a network interface of the apparatus,
changing a frame sequence number used by the network interface of the apparatus in an unpredictable manner, and
performing said changing of the access address and changing of the frame sequence number in a coordinated manner.
According to a third example aspect of the invention there is provided a computer program comprising computer executable program code which, when executed by at least one processor of an apparatus, causes the apparatus to change an access address of a network interface of the apparatus,
change a frame sequence number used by the network interface of the apparatus in an unpredictable manner, and
perform said changing of the access address and changing of the frame sequence number in a coordinated manner.
The computer program of the third example aspect can be stored or embodied on a non-transitory memory medium/a computer readable medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

Figure 1A:
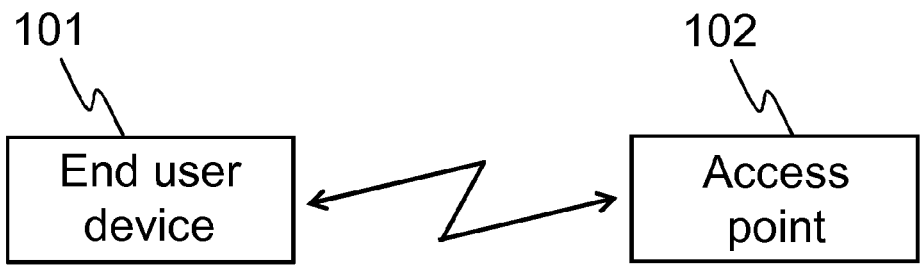
FIG. 1A shows a block diagram of a system according to an example embodiment of the invention.

For example, periodically varying access addresses (an access address being an address that is used by a network interface of an apparatus) or payload encryption may be used in data packets sent over a wireless communication medium for avoiding identification of the sending/receiving node on the basis of data packets captured by a third party. But this may not suffice in all cases. Even if a wireless network node uses different access addresses in different locations and at different times and/or the payload in data packets the wireless network node receives/sends are encrypted, the node may still be identifiable by constant or predictable content in header fields of the data packets other than the access addresses.

In IEEE 802.11 implementations, the tuple <service class, MAC address, frame sequence number> identifies each individual frame sent by the same node over a given network interface, to allow detection of duplicates on reception. Frame sequence numbers are 12-bit values that are incremented by one from zero to 4095 for each subsequent frame sent, and wrap around at overflow. When a network interface of a wireless network node starts or is reset, the initial frame sequence number is set to zero.

A problem in this scenario is that a wireless network node may be identifiable and thus tracked based on the frame sequence number in the (always unencrypted) IEEE 802.11 packet header irrespective of whether periodically changing access (i.e., MAC) addresses and/or payload encryption are used for that network interface.

In an example embodiment of the invention this problem is solved by changing the frame sequence number used by a network interface in an unpredictable (for example cryptographically random) manner at least whenever the MAC address of the network interface of a wireless network node changes. That is, an example embodiment of the invention provides changing the MAC address (or other access address) and randomizing the frame sequence number.

In an example embodiment, instead of setting frame sequence number to zero upon initialization as is done in current IEEE 802.11 implementations, the frame sequence number is changed to a randomly chosen unpredictable number in connection with (or in response to) changing MAC address (or other access address) of a network interface of a wireless network node.

Another example embodiment provides mechanisms to deal with fragmented packets.

Embodiments of the invention can be applied to multiple different nodes in a wireless network, including access points and end user devices. Furthermore, embodiments of the invention can be applied to nodes of wired networks, too.

Various examples discussed herein show wireless network nodes that have a single wireless network interface. It must be noted that embodiments of the invention can be applied to network nodes with multiple wireless network interfaces, too. Furthermore, it is not mandatory that all wireless network interfaces of a certain network node implement one of the embodiments of the invention. Some interfaces may implement some embodiment and some interfaces may implement some other embodiment and some may not implement any embodiment of the invention. Depending on the implementation, any combination can be chosen.

FIG. 1A shows a block diagram of a system 100 according to an example embodiment of the invention. The system comprises two wireless network nodes; an end user device 101 and an access point 102. The end user device 101 and the access point 102 communicate with each other over a wireless communication connection.

Figure 1B:
FIG. 1B shows a block diagram of a system according to another example embodiment of the invention.

FIG. 1B shows a block diagram of a system 110 according to another example embodiment of the invention. The system comprises two wireless network nodes; an end user device 111 and another end user device 112. The end user devices 111 and 112 communicate with each other over a wireless communication connection.

In FIGS. 1A and 1B the end user device 101, the access point 102, and the end user devices 111 and 112 each comprise a single network interface. It is however possible that one or more of these devices would comprise more than one network interface.

In an example embodiment the wireless communication connection in FIGS. 1A and 1B implements IEEE 802.11 protocol. In another embodiment the wireless communication connection implements Bluetooth protocol. Also other wireless data link protocols may be used in a system according to various embodiments of the invention. In an example implementation the mechanisms of various embodiments are applicable to wired networks.

Figure 2:
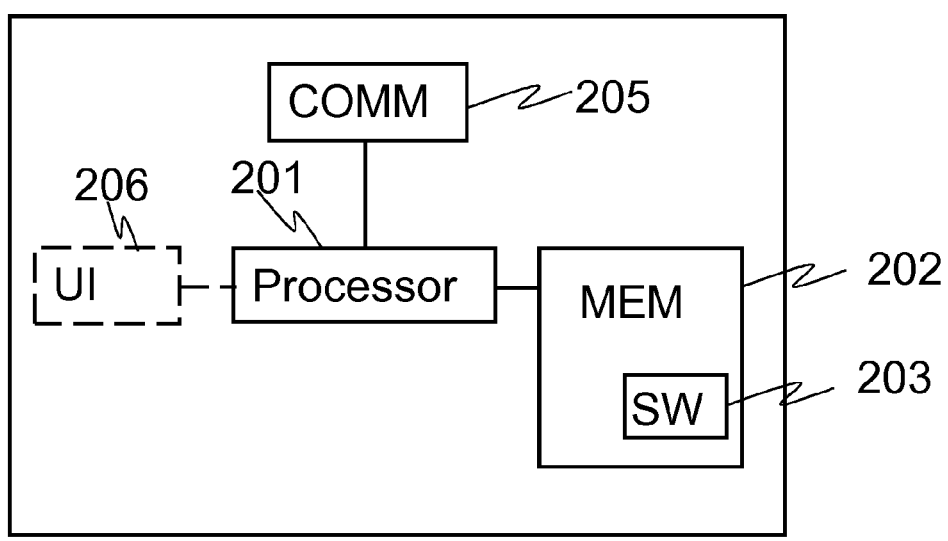
FIG. 2 shows a block diagram of an apparatus according to an example embodiment of the invention.

FIG. 2 presents an example block diagram of an apparatus 200 in which various embodiments of the invention may be applied. The apparatus 200 is capable of operating as a wireless network node and may be a user equipment (UE), user device or apparatus, such as a mobile terminal or other communication device, or an access point or other network node. As an example, the apparatus 200 may be the end user device 101 of FIG. 1A or the access point 102 of FIG. 1A or the end user device 111 or 112 of FIG. 1B.

The general structure of the apparatus 200 comprises a communication interface 205, a processor 201, and a memory 202 coupled to the processor 201. The apparatus 200 further comprises software 203 stored in the memory 202 and operable to be loaded into and executed in the processor 201. In some embodiments, the software 203 comprises one or more software modules and can be in the form of a computer program product. The apparatus 200 may further comprise a user interface controller 206 coupled to the processor 201.

The processor 201 may be, e.g., a central processing unit (CPU), a microprocessor, a digital signal processor (DSP), a graphics processing unit, or the like. FIG. 2 shows one processor 201, but in some embodiments the apparatus 200 comprises a plurality of processors.

The memory 202 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some embodiments, the apparatus 200 comprises a plurality of memories. The memory 202 may be constructed as a part of the apparatus 200 or it may be inserted into a slot, port, or the like of the apparatus 200 by a user. The memory 202 may serve the sole purpose of storing data, or it may be constructed as a part of an apparatus serving other purposes, such as processing data.

The communication interface module 205 may be, e.g., a radio interface module, such as a WLAN, Bluetooth, ZigBee, GSM/GPRS, CDMA, WCDMA, or LTE (Long Term Evolution) radio module. The communication interface module 205 may be integrated into the apparatus 200 or into an adapter, card or the like that may be inserted into a suitable slot or port of the apparatus 200. The communication interface module 205 may support one wireless radio interface technology or a plurality of technologies. FIG. 2 shows one communication interface module 205, but in some embodiments the apparatus 200 comprises a plurality of communication interface modules 205. In an embodiment of the invention the communication interface module 205 comprises a wireless modem configured to implement wireless communications.

In an example embodiment, the apparatus 200 comprises a user interface unit 206 (shown with dashed line). The user interface unit 206 typically includes a display and keyboard or keypad for user interaction. The display may be for example a liquid crystal display (LCD) or a light-emitting diode (LED) based display. A touch-sensitive surface may be integrated to the display 640 as a touch display or a touch screen. The touch-sensitive surface may also be included as a separate element, for example as a touchpad. It is not mandatory to have the user interface for the operation of embodiments of invention, though. Instead, controlling of the apparatus 200 may be effected by means of a remote connection through the communication unit 205.

A skilled person appreciates that in addition to the elements shown in FIG. 2, in some embodiments the apparatus 200 comprises other elements, such as microphones, extra displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus 200 when external power if external power supply is not available.

As to the operations of the embodiments of the invention, when the computer program code 203 is executed by the at least one processor 201, this causes the apparatus 200 to implement operations according to some embodiment of the invention.

Figure 3:
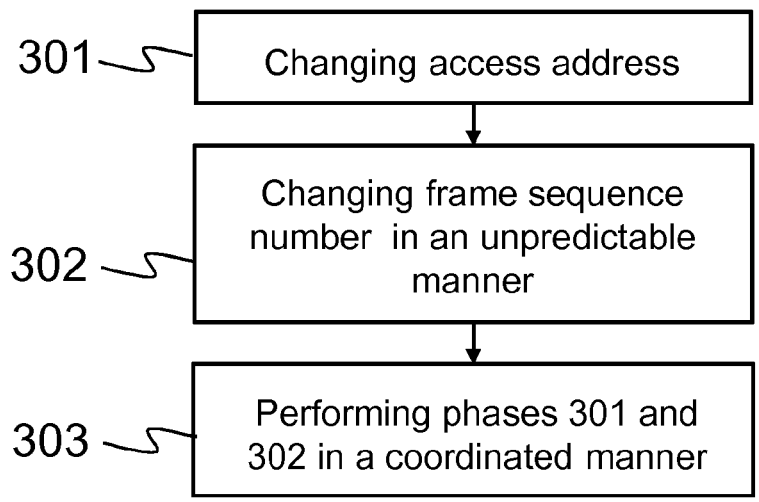
FIG. 3 shows a flow diagram of a method according to an example embodiment of the invention.

FIG. 3 shows a flow diagram of a method according to an example embodiment of the invention. The method may be performed by the end user device 101 of FIG. 1A, by the access point 102 of FIG. 1A, by the end user device 111 or 112 of FIG. 1B, or by the apparatus 200 of FIG. 2.

In phase 301, an access address of a network interface of a wireless network node is changed. In an example, the access address is an access address according to a data link protocol. In an example, the access address is a MAC address. It must be noted that embodiments of the invention apply to other access addresses than MAC address, too. The access address can be defined as an address that is needed in order to be able to communicate with a device (i.e., send messages or data to the device). As an alternative, the access address can be defined as an interface address or a network interface address.

In phase 302, a frame sequence number of the network interface of the wireless network node is changed in an unpredictable manner. In an example, the frame sequence number is a frame sequence number according to a data link protocol. In an example, the frame sequence number is changed into a random number in the range of all possible frame sequence number values.

In phase 303, the changing of the access address and changing of the frame sequence number are performed in a coordinated manner. In an example, this means that the changing of the access address and changing of the frame sequence number are performed at the same time. In an example, this means that the changing of the access address and changing of the frame sequence number are performed consecutively, that is one in response to the other one. In an example, this means that the frame sequence number is changed in response to changing the access address.

In an example embodiment the changing of the access address and changing of the frame sequence number are performed during an idle period during which no data packets/frames are received or transmitted. Additionally or alternatively, the changing of the access address and changing of the frame sequence number may be performed at regular intervals, or even irregular intervals. In an example implementation, irregular intervals provide regular changes over a longer period of time. To illustrate this point, if the intervals are uniformly distributed random variables having the mean value of three hours, then there will be approximately eight changes in 24 hours. On the average, this is equivalent to having regular (in the sense of equal) intervals of three hours each.

In an example embodiment the changing of the access address and changing of the frame sequence number are performed in a wireless modem of the wireless network node. For example the communication interface module 205 of FIG. 2 may comprise the wireless modem. That is, in this case the wireless modem performs the changes independently from a processor of the wireless network node. After making the changes the wireless modem informs the processor of the wireless network node (e.g. processor 201 of FIG. 2) about the changes in an example embodiment. In another alternative the wireless modem executes the changes transparently.

In an example embodiment the changing of the access address and changing of the frame sequence number are performed by a processor of the wireless network node (e.g. processor 201 of FIG. 2). After making the changes the processor reconfigures a wireless modem of the wireless network node (e.g. a wireless modem in the communication interface module 205 of FIG. 2) to use the changed access address and changed frame sequence number.

In an example embodiment the methods of various embodiments are applied into communications according to IEEE 802.11 protocol. In an example embodiment the methods of various embodiments are applied into communications according to Bluetooth protocol. In a further example embodiment the methods of various embodiments are applied into communications according to some other suitable data link protocol, where frame sequence number is used to detect packet duplicates.

In the following, further details of an example embodiment are discussed. It is desirable that the changing of the frame sequence number is done in a way such that (a) it is still possible to use the frame sequence numbers to detect packet duplicates (i.e., the change must not harm cause interoperability issues with standard IEEE 802.11 implementations for example); and (b) tracking a wireless network node based on the frame sequence numbers in its packets becomes difficult.

By randomizing both the access address (MAC address) and initial frame sequence number in a coordinated fashion one can achieve property (b) while maintaining property (a).

In an embodiment the properties (a) and (b) are maintained as follows:

Property (a): Let us start with defining a desired property, labeled (a'), of the new MAC address choice: the new MAC address chosen by a wireless network node for a given wireless network interface that it wishes to avoid tracking for is different from any one of the currently active MAC addresses in the wireless network.

In the receiving wireless network nodes, packets are identified by the tuple <service class, MAC address, frame sequence number>, where the MAC address is the 'Address 1' field of the MAC header; and uniqueness of any one of those three parts would be sufficient for the uniqueness of the whole tuple. Therefore, if (a') holds, then the tuple <service class, MAC address, frame sequence number> will be unique after the MAC address change. Moreover, in this case the uniqueness property is independent from how the new value of the frame sequence number has been chosen.

Thus, if the property (a') holds, then any frame sequence number assignment will maintain the property (a).

In an example embodiment, the choice of the new MAC address is done uniformly at random from the available MAC address space. Property (a') can be achieved with very high probability by this method. For example, with 48 bit MAC addresses the MAC address space is $2^{48}$ values. Given that the number of active MAC addresses in the wireless network is N, a random choice of a new MAC address from that address space will maintain property (a') with probability $p=1-N/2^{48}$. Since typically N<1000, the probability p will typically exceed $1-10^3/2^{48}$, or about $1-4/10^{12}$. Other algorithms for choosing a new MAC address are also possible.

In cases where this collision probability is deemed unacceptable because it is too high, methods according to other embodiments may be used. In an example embodiment, all wireless network nodes broadcast "neighbor solicitation" messages whenever they generate a new randomized candidate MAC address (i.e. when they change the access address), in order to determine if it is currently in use in the network. When a wireless node receives a neighbor solicitation for an address it is currently using, it must respond, to allow the sender to detect this conflict. When the sender detects a conflict, the randomization and detection steps are repeated, until a candidate address is generated that is not in use. During the duplicate address detection period, it is desirable not to allow any other network traffic to be sent or received.

Property (b): In order to explain the issue, we start with an example where the frame sequence number is set to zero whenever the MAC address of a network interface of a wireless network node changes. Such setting of a frame sequence number is predictable and therefore might not maintain property (b).

An attacker seeing in a packet header a 'new' (i.e. previously unseen) MAC address and frame sequence number zero can infer with high probability that the sending wireless network node has just changed the MAC address of the network interface it uses to connect to the wireless network. Thus, property (b) is not true with this setting of frame sequence number.

The reason is that the only other event that explains a combination of a 'new' MAC address and frame sequence number zero in a packet header is rather rare: It is that the sending device has just moved into the wireless network coverage and at the same time also its frame sequence number has been set to zero without MAC address change (recall that the frame reset occurs once in 4096 packets due to wrap around).

By similar argument any assignment of frame sequence number (when the MAC address of the device changes) that is predictable by an attacker does not satisfy property (b).

In order to maintain property b), in an example implementation of an embodiment the frame sequence number is chosen randomly from the range [0, 4096] ($4096=2^{12}$). In an example embodiment, the choice of the frame sequence number is done uniformly at random. In an alternative embodiment, the choice follows some other suitable selection algorithm.

This implementation maintains property (b), because based on a frame sequence number in a packet header an attacker cannot distinguish between a wireless network node that has presently changed its MAC address to avoid tracking and a wireless network node that has just moved into the wireless network coverage.

In the following example embodiments dealing with fragmented packets are discussed.

The frame sequence number is part of a 16 bit 'sequence control' field. This field comprises, in addition to the frame sequence number (12 bits), a fragment number (4 bits, i.e. a maximum of 16 fragments) of that frame. The frame sequence number stays constant in all fragment frames containing parts belonging to the same original packet. The fragment number in a fragment frame starts from zero and is incremented by one with each subsequent fragment sent. Each fragment needs to be acknowledged before the next fragment is transmitted.

Now if the sender of a fragmented data packet changes its MAC address during transmission of the fragments, there are two issues that need attention. First, fragments of the same packet having different sender's MAC addresses are difficult to assemble at the receiving (benign) wireless network node. Second, the sending node may still be tracked by an attacker because the next fragment number is predictable. Therefore, the sending node should (i) preferably not change its MAC address during transmission of fragmented packets; and (ii) if the MAC address change still happens during transmission of a fragmented packet, then the sending node should stop sending any further fragments of that packet after the MAC address change. Thereafter all fragments may be resent with the new access address and frame sequence number, though. In both cases all fragments of a fragmented packet shall be sent using the same access address and the same frame sequence number in order to ensure correct receipt and reassembly of the fragments at the intended receiver.

Figure 4:
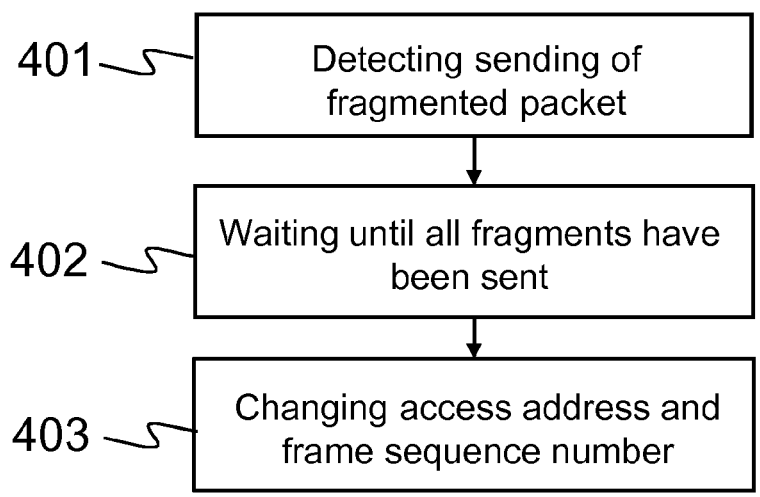
FIG. 4 shows a flow diagram of a method according to another example embodiment of the invention.

Thus, a method according to an embodiment of the invention comprises avoiding changing of the access address and frame sequence number during sending of a fragmented data packet. FIG. 4 illustrates a flowchart of a method according to such implementation.

In phase 401, it is detected that a fragmented packet is being sent. Therefore, in phase 402, the process waits until all fragments of the fragmented packet have been sent (and possibly also received by the intended receiver). Then, in phase 403, the method proceeds to changing the access address and the frame sequence number. The phase 403 may comprise the phases of FIG. 3 for example.

Figure 5:
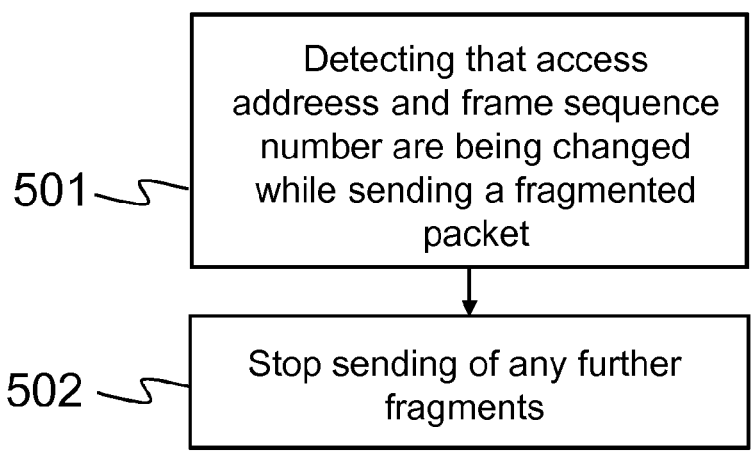
FIG. 5 shows a flow diagram of a method according to yet another example embodiment of the invention.

A method according to another embodiment of the invention comprises detecting that the access address and frame sequence number are being changed during sending of fragments of a fragmented data packet, and responsive to that detecting, stopping the sending of unsent fragments. FIG. 5 illustrates a flowchart of a method according to such implementation.

In phase 501, it is detected that the access address and frame sequence number are being changed while a fragmented packet is being sent. For example, the phases of FIG. 3 are being performed during sending of fragments of a fragmented packet. In response to this, in phase 502, the process stops sending any further fragments of the fragmented packet. That is, fragments that have not been sent will not be sent at all. After the access address and frame sequence number have been changed, all fragments of the fragmented packet may be resent, though, using the new access address and the new frame sequence number.

Without in any way limiting the scope, interpretation, or application of the claims appearing below, a technical effect of one or more of the example embodiments disclosed herein is that it is more difficult to monitor the location of a particular user since the frame sequence number changes in an unpredictable manner.

A technical effect of changing the access address and the frame sequence number during an idle period, that is when the wireless network node is not sending or receiving data packets, is increased security. If the access address and the frame sequence number are changed while packets are being sent or received, it may remain possible for an attacker to identify the node based on the characteristics of its ongoing traffic flows. Therefore performing the changes during idle periods provides better security.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:
1. A method comprising:
changing an access address of a network interface of a wireless network node, changing a frame sequence number of the network interface of the wireless network node in an unpredicted manner, performing said changing of the access address and changing of the frame sequence number substantially at the same time; and thereafter transmitting a frame to or from the wireless network node having a header comprising the changed access address and the changed frame sequence number;

the method further comprising avoiding changing of said access address and frame sequence number during sending of a fragmented data packet.

2. A method of claim 1, changing said frame sequence number in an unpredicted manner comprises:

changing said frame sequence number randomly.

3. A method of claim 1, further comprising:

performing said changing of the access address and changing of the frame sequence number during an idle period.

4. A method of claim 1, further comprising:

performing said changing of the access address and changing of the frame sequence number on regular intervals.

5. A method of claim 1, further comprising:

performing said changing of the access address and changing of the frame sequence number in a wireless modem of the wireless network node independently from a processor of the wireless network node, and informing the processor of the wireless network node about said changing of the access address and changing of the frame sequence number.

6. A method of claim 1, further comprising:

performing said changing of the access address and changing of the frame sequence number by a processor of the wireless network node, and reconfiguring a wireless modem of the wireless network node to use the changed access address and changed frame sequence number.

7. A method of claim 1, wherein said access address is a media access control address.

8. A method of claim 1, further comprising:

sending fragments of a fragmented packet, and arranging that all fragments of the fragmented packet are being sent using the same access address and the same frame sequence number.

9. A method of claim 1, further comprising:

detecting that said access address and frame sequence number are being changed during sending of fragments of a fragmented data packet, and responsive to said detecting, stopping the sending of unsent fragments.

10. An apparatus comprising:

at least one processor; and at least one memory including computer program code, the at least one memory and the computer program code being configured to, with the at least one processor, cause the apparatus at least to perform:

changing an access address of a network interface of the apparatus, changing a frame sequence number used by the network interface of the apparatus in an unpredicted manner, performing said changing of the access address and changing of the frame sequence number substantially at the same time; and thereafter transmitting a frame having a header comprising the changed access address and the changed frame sequence number;

the at least one memory and the computer program code configured with the at least one processor to cause the apparatus further to avoid changing of said access address and frame sequence number during sending of a fragmented data packet.

11. An apparatus of claim 10, wherein the at least one memory and the computer program code are configured to, with the at least one processor, cause the apparatus to perform said changing of the access address and changing of the frame sequence number during an idle period.

12. An apparatus of claim 10, comprising:

a wireless modem configured to perform said changing of the access address and changing of the frame sequence number independently from each of the at least one processor of the apparatus, and to inform the at least one processor about said changing of the access address and changing of the frame sequence number.

13. An apparatus of claim 10, comprising:

a wireless modem, and wherein the at least one processor is configured to perform said changing of the access address and changing of the frame sequence number, and to reconfigure the wireless modem to use the changed access address and changed frame sequence number.

14. An apparatus of claim 10, wherein the at least one memory and the computer program code are configured to, with the at least one processor, cause the apparatus to perform:

detecting that said access address and frame sequence number are being changed during sending of fragments of a fragmented data packet, and responsive to said detecting, stopping the sending of unsent fragments.

15. A non-transitory computer readable memory storing computer executable program code which, when executed by at least one processor of an apparatus, causes the apparatus to:

change an access address of a network interface of the apparatus, change a frame sequence number used by the network interface of the apparatus in an unpredicted manner, perform said changing of the access address and changing of the frame sequence number substantially at the same time; and thereafter transmitting a frame to or from the wireless network node having a header comprising the changed access address and the changed frame sequence number;

the method further comprising avoiding changing of said access address and frame sequence number during sending of a fragmented data packet.

* * * * *